United States Patent [19]

Buma

[11] Patent Number: 4,653,735

[45] Date of Patent: Mar. 31, 1987

[54] SUSPENSION FOR VEHICLE

[75] Inventor: Shuuichi Buma, Toyota, Japan

[73] Assignee: Toyota Jidosha Kabushiki Kaisha, Toyota, Japan

[21] Appl. No.: 779,046

[22] Filed: Sep. 23, 1985

[30] Foreign Application Priority Data

Nov. 8, 1984 [JP] Japan ................ 59-235868

[51] Int. Cl.$^4$ .............................. F16F 9/34
[52] U.S. Cl. ................... 267/8 R; 188/299; 188/319; 248/566; 248/636; 267/33; 267/140.1; 267/152
[58] Field of Search ............ 267/8 R, 35, 140.1, 267/64.25, 64.24, 64.15, 34, 33, 152; 180/300; 248/562–566, 636; 188/298, 299, 319, 321.11; 280/668, 707, 712

[56] References Cited

U.S. PATENT DOCUMENTS

| | | | |
|---|---|---|---|
| 2,061,068 | 11/1936 | Fuchs | 188/299 |
| 4,305,486 | 12/1981 | Cowan | 188/299 X |
| 4,313,529 | 2/1982 | Kato et al. | 188/299 |
| 4,364,582 | 12/1982 | Takahashi et al. | 188/299 X |
| 4,527,676 | 7/1985 | Emura et al. | 188/319 X |
| 4,534,580 | 8/1985 | Kobayashi et al. | 280/712 |

FOREIGN PATENT DOCUMENTS

| | | | |
|---|---|---|---|
| 3340153 | 8/1984 | Fed. Rep. of Germany | 267/8 R |
| 58-76837 | 5/1983 | Japan . | |
| 97334 | 6/1984 | Japan | 267/140.1 |
| 2105438 | 3/1983 | United Kingdom | 188/321.11 |

Primary Examiner—Andres Kashnikow
Assistant Examiner—Richard R. Diefendorf
Attorney, Agent, or Firm—Oblon, Fisher, Spivak, McClelland & Maier

[57] ABSTRACT

A suspension for a vehicle includes a shock absorber provided with a tube, a piston partitioning the interior of the tube into two liquid chambers and a piston rod connected to the piston having a bypass path for affording communication between the two liquid chambers, a control shaft disposed in the piston rod of the shock absorber to open and close the bypass path, a support interposed between the piston rod and a car body and provided with a valve base connected to the piston rod, having a hole in which a valve body is disposed and a bushing disposed radially outward of the valve base, having two fluid chambers, the valve body disposed in the hole of the valve base to afford and interrupt communication between the two fluid chambers of the bushing and an actuator for operating the control shaft and the valve body.

9 Claims, 5 Drawing Figures

SUSPENSION FOR VEHICLE

BACKGROUND OF THE INVENTION

1. Field of the Invention:

This invention relates to a suspension, and more particularly to a suspension for a vehicle provided with a shock absorber capable of adjusting a damping force and having a control shaft disposed in a piston rod for adjusting the damping force.

2. Description of the Prior Art:

When a piston rod of a shock absorber is connected to a car body, an assembly is employed which interposes a rubber bushing between the piston rod and the car body to prevent vibrations from being transmitting from the shock absorber to the car body. This applies also to the case of a shock absorber capable of adjusting a damping force.

With few exceptions (for example, Japanese Utility Model Public Disclosure (KOKAI) No. 76837/83), the bushing cannot change its spring constant after being incorporated in the car body with a predetermined shape or the like since the spring constant is determined unconditionally.

U.S. patent application Ser. No. 753,785 concerns a construction in which a shock absorber having a piston rod is connected to a car body. In this assembly, a bushing disposed radially outward of a valve base connected to the piston rod has a plurality of fluid chambers which are adapted to communicate to and be insulated from each other by a valve body disposed on the valve base. However, the damping force of the shock absorber cannot be adjusted.

SUMMARY OF THE INVENTION

Since a bushing is set to harden the spring property from the viewpoint of controllability, the bushing itself cannot be softened to reduce shock minutely even if the damping force is softened in the case of a suspension provided with a shock absorber capable of adjusting a damping force. On the contrary, since the set hardness of the bushing is itself limited even if the damping force is hardened the adjusting range of the controllability is narrowed.

In the insulation construction disclosed in said Public Disclosure, a first fluid chamber is defined by the bushing and a plate member and a second fluid chamber is defined by a diaphragm disposed on the opposite side of the plate member to the bushing and the plate member. Both fluid chambers communicate with each other through an orifice and are filled with fluid. Even if the shock absorber is connected to the car body through the insulation construction, the same result as the one mentioned is obtained since the insulation construction cannot change the spring constant of the bushing manually or automatically from the outside.

An object of the present invention is to provide a suspension capable of adjusting the damping force of a shock absorber and the spring constant of a bushing manually or automatically from the outside.

The suspension according to the present invention comprises a shock absorber provided with a tube, a piston for partitioning the inside of the tube into two liquid chambers and a piston rod connected to said piston and having a bypass path affording communication between said two liquid chambers, a control shaft disposed in said piston rod of the shock absorber to open and close said bypass path, a support interposed between said piston rod and a car body and provided with a valve base connected to said piston rod and having a hole in which a valve body is disposed and a bushing disposed radially outward of said valve base and having a plurality of fluid chambers, the valve body being disposed in said hole of the valve base to afford and interrupt communication between a plurality of said fluid chambers and an actuator for operating said control shaft and valve body.

According to the present invention, the damping force of the shock absorber, the spring constant and the damping force of the bushing can be adjusted manually or automatically from the outside. By both the shock absorber and the bushing having soft properties, the resulting shock is lightened minutely to provide a better rid. Also, by both having hard properties the adjusting range of controllability can be widened, so that proper controllability corresponding to travelling condition can be obtained.

Since the valve body is disposed in the valve base provided in the support for connecting the shock absorber to the car body, a compact suspension can be provided as a whole.

Other objects and features of the present invention will become apparent from the following description of a preferred embodiment of the invention with reference to the accompanying drawings.

DESCRIPTION OF THE PREFERRED EMBODIMENT

Figure 1:
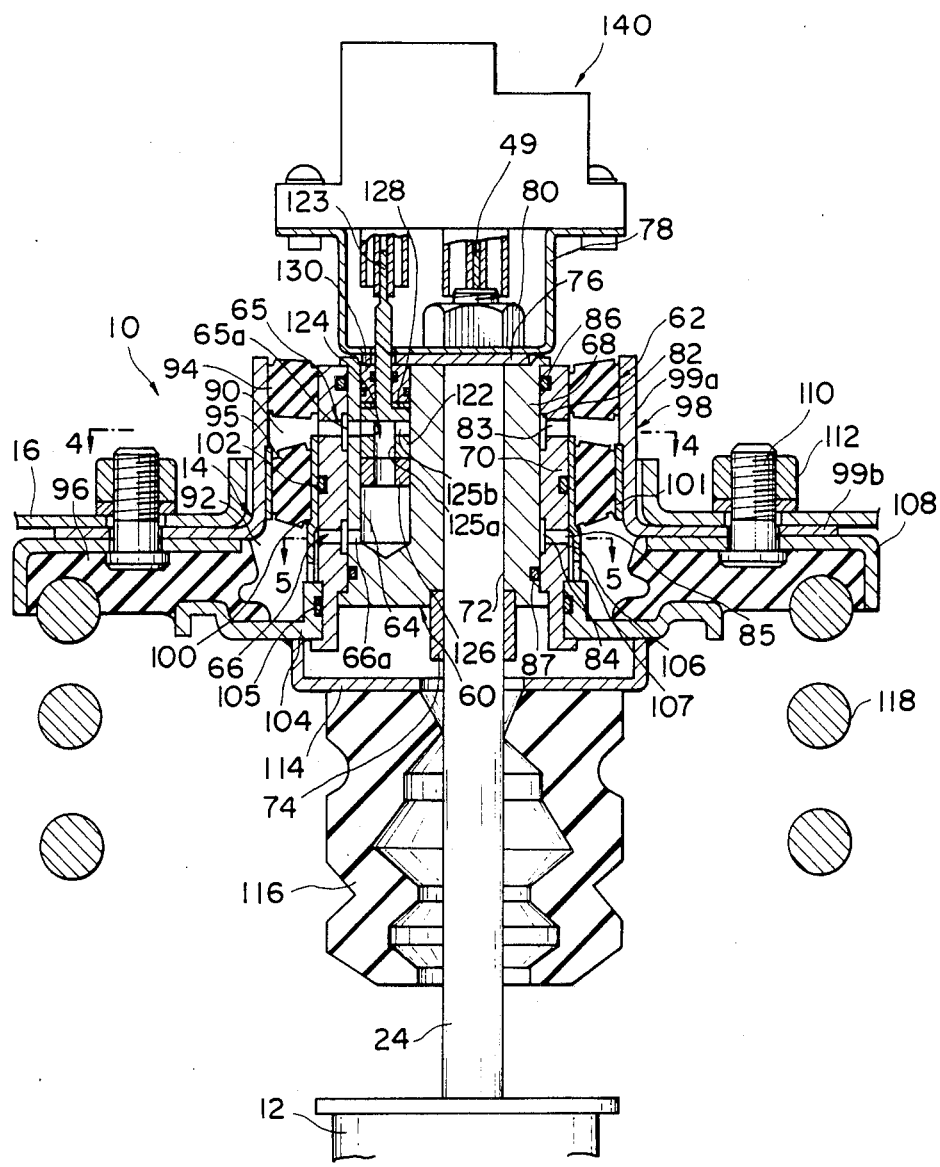
FIG. 1 is a sectional view showing a support of a suspension system according to the present invention.

As shown in FIG. 1, a suspension system 10 comprises a shock absorber 12 and a support 14. The shock absorber 12 is connected to a car body 16 through the support 14.

Figure 2:
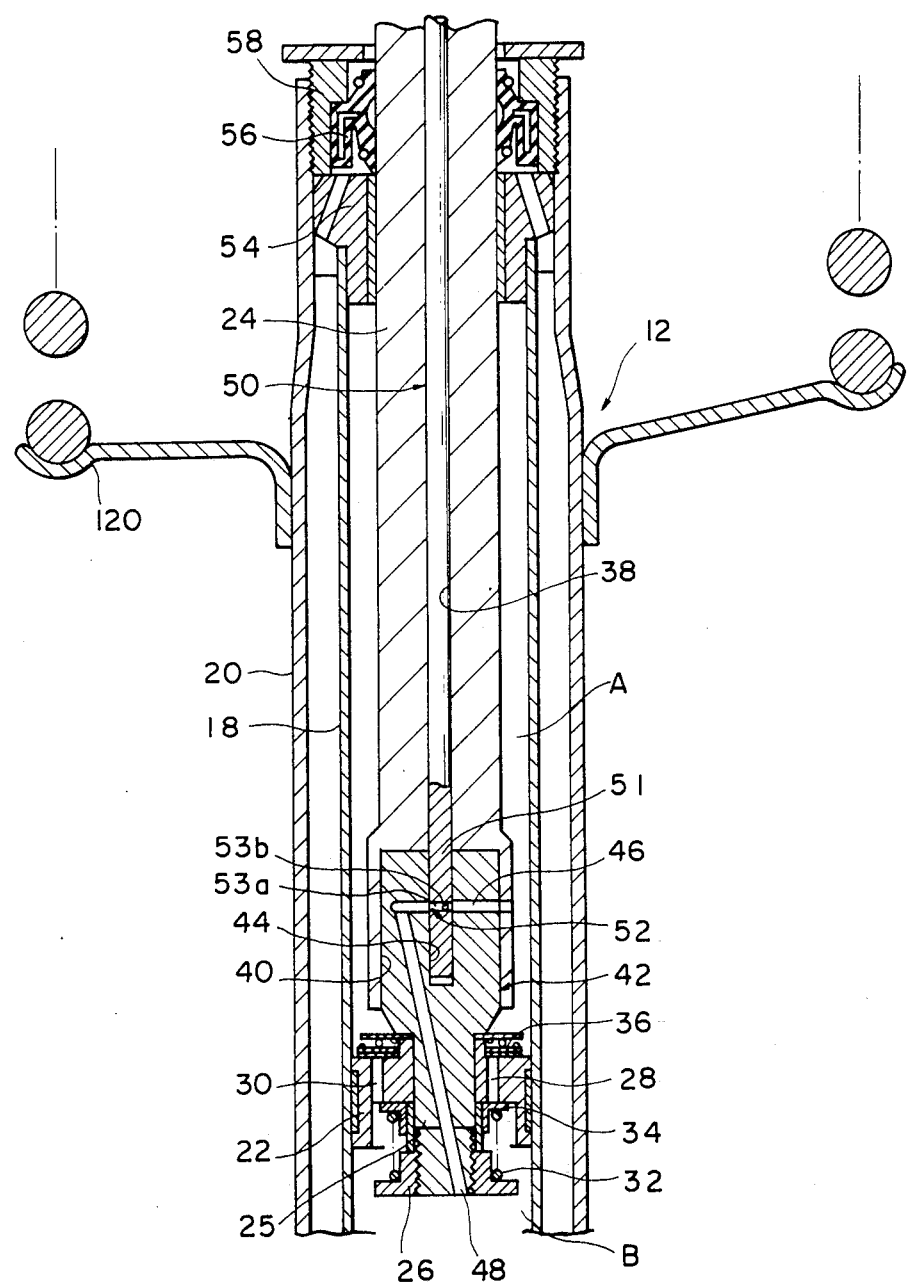
FIG. 2 is a sectional view showing principal parts of a shock absorber of the suspension.

In the embodiment shown in FIG. 2, the shock absorber 12 is of a so-called twin tube type provided with an inside tube 18 and an outside tube 20 disposed radially outward and spaced from the tube 18. A so-called mono-tube type comprising only a single tube may be also used for the shock absorber 12. Oil or other liquids are filled in the tube 18 and a lower portion of an interval between the inside and outside tubes.

A piston 22 is disposed movably in the tube 18. A lower end 25 of a piston rod 24 is positioned within the piston 22 and a nut 26 is screwed onto the end to couple the piston 22 with the piston rod 24. The piston 22 has a plurality of ports 28 (one only being shown in the drawing) spaced circumferentially through which liquid flows in the extension of the piston rod 24 and a plurality of ports 30 (only one being shown) spaced circumferentially through which liquid flows in the contraction of the piston rod 24, and a valve body 34 biased by a spring 32 bears against underside openings of the ports 28. Also, a valve body 36 formed of a leaf spring bears against upside openings of the ports 30.

While a base valve assembly well known per se is disposed on the bottom of the tube 18, such is not shown in the drawing since it is not related directly to the present invention.

The piston rod 24 has a longitudinal hole 38 extended axially from an upper end and a hole 40 bored in a lower end. A rod portion 42 is press fitted into the bored hole 40 and the end 25 projecting downward from the rod portion 42 is connected to the piston 22 as above mentioned.

The rod portion 42 is provided with a longitudinal hole 44 extended axially to communicate to the longitudinal hole 38, a path or passage 46 extended radially and crossing the longitudinal hole 44 and a slant path 48 bored to cross the piston 22 from a lower end and communicate to the path 46. The path 46 in the rod portion communicates with a liquid chamber A defined in an upper side of the piston through a path bored from the bored hole 40 toward an outer periphery. As a result, a bypass path or passage affording communication between the upper and lower side liquid chambers A, B is formed in the piston rod 24 by the slant path 48 and the path 46.

A control shaft 50 is disposed rotatably in the longitudinal hole 38 in the piston rod 24. The shaft has on a lower end an adjusting portion 51 inserted into the longitudinal hole 44 provided in the rod portion 42. The adjusting portion 51 is provided with a path 52 capable of being opposed to the path 46. In the embodiment shown in the drawing, the path or passage 52 consists of a path portion or passage 53a opened radially and a path portion 53b opened radially spaced from the path portion 53a at the circumferential interval of 60° and formed to have a bore smaller than that of the path portion 53a. When the path portion 53a communicates with the path 46, the bypass path has a large effective section, and when the path portion 53b communicates to the path 46, the bypass path has a small effective section. When the path 52 is off the path 46, the bypass path is interrupted. A clearance between the control shaft 50 and the longitudinal hole 38 is made liquid tight by a proper O-ring (not shown).

The piston rod 24 extends through a rod guide 54 and a seal member 56 disposed on the upper ends of the tubes 18, 20 and is fixed thereto by a ring nut 58 so as to project to the outside. The lower ends of the tubes 18, 20 are coupled with each other by a construction known per se. To the outside tube 20 is connected a suspension arm (not shown).

As is shown in FIG. 1, the support 14 comprises a valve base 60 and a bushing 62. The valve base 60 has a hole 64 into which a valve body is inserted and first and second paths or passages 65, 66 spaced axially of the hole 64 and respectively communicating to the hole 64. In the embodiment shown in FIG. 1, the valve base 60 consists of a first member 68 disposed inside and formed of high rigidity material like iron and a second member 70 disposed outside and formed of same high rigidity material. This is for the sake of convenience when the valve base 60 and the bushing 62 are formed, while the valve base 60 may be formed of a single member. By forming the valve base 60 of high rigidity member and disposing the valve body therein which will be later described the valve body is securely held at a predetermined position even if the bushing 62 is displaced during use.

The first member 68 has a hole 72 through which the piston rod 24 extends, the hole 64 for valve body insertion extending parallel to the hole 72 from an upper surface to an intermediate portion, a first path portion or passage 65a extending from an upper portion of the hole 64 toward an outer peripheral surface and a second path portion or passage 66a extending from a lower portion of the hole 64 toward the outer peripheral surface. In the embodiment shown in FIG. 4, the first path portion 65a consists of a pair of holes 65b extending diametrally from the hole 64 and a pair of holes 65c extending diametrally at a position spaced circumferentially 60° from the hole 65b and having the bore smaller than that of the hole 65b. Also, in the embodiment shown in FIG. 5, the second path portion or passage 66a consists of a pair of holes 66b extending diametrally from the hole 64 and a pair of holes 66c extending diametrally at a position spaced circumferentially 60° from the hole 66b and having the same bore as the hole 66b.

The piston rod 24 extends through the hole 72 in the valve base 60. A ring 74 fixed to the piston rod bears against a shoulder of the hole 72. A washer 76 and a bracket 78 of an actuator are applied to a portion of the piston rod projecting from the first member 68. A nut 80 is screwed onto the projecting portion. Thus, the piston rod 24 is coupled with the first member 68.

The second member 70 has an annular groove 82 provided in a position opposed to the first path portion 65a of the first member 68, a plurality (i.e. four in FIG. 4) of first path portions 83 extending radially from the annular groove 82, an annular groove 84 provided in a postion opposed to the second path portion 66a of the first member 68 and a plurality (four in FIG. 5) of second path portions or passages 85 extending radially from the annular groove 84.

The first path 65 is formed of the first path portion 65a of the first member 68, the annular groove 82 of the second member 70 and the first path portion 83. Also, the second path 66 is formed of the second path portion 66a of the first member 68, the annular groove 84 of the second member 70 and the second path portion 85.

An O-ring 86 for sealing is fixed to a position above the annular groove 82 of the second member 70 and an O-ring 87 fixed to a position below the portion of the first member 68 opposed to the annular groove 84. The first member 68 is fitted in the second member 70, and caulked to couple both members 68, 70 with each other and form the valve base 60.

The bushing 62 has a first fluid chamber 90 communicating to the first path 65 and a second fluid chamber 92 communicating to the second path 66 and is disposed radially outward of the valve base 60. In the embodiment shown in FIG. 1, the bushing 62 consists of first, second and third portions 94, 95 and 96 respectively annularly formed of rubber.

The first portion 94 of the bushing is vulcanized and bonded on an inside surface to an end of the second member 70 above the first path 65 of the valve base 60 and on an outside surface to an upper end of a cylindrical portion 99a of a connecting member 98 respectively. The second portion 95 of the bushing is vulcanized and bonded on an inside surface to an inner tube 100 and on an outside surface to an outer tube 101 respectively. The second portion 95 is securely fixed to the second member 70 by making the inner tube 100 fit in a position below the first path 65 of the second member 70 to which an O-ring 102 is fixed and to the connecting member 98 by making the outer tube 101 fit in the cylindrical portion 99a of the connecting member 98. As a result, the first fluid chamber 90 is defined between the first and second portions 94, 95 of the bushing.

In the embodiment shown in FIG. 1, the inner tube 100 extends downward over the second path 66 so that a lower end abuts against a shock receiving member 104. The second member 70 is fitted in the shock receiving member 104 to which an O-ring 105 is fixed, and caulked to couple both with each other. The diameter of the inner tube 100 is enlarged below the portion opposed to the second path 66 to form a gap 106 between the tube 100 and the second member 70. The gap 106 communicates on one hand to the second path 66 and on the other hand to the second fluid chamber 92 through a plurality of notches 107 provided on the inner tube 100. Such constitution of the inner tube 100 is for the sake of convenience of locating the inner tube 100.

The third portion 96 of the bushing is vulcanized and bonded on an upper end face to a second connecting member 108 and on an inner periphery of the lower end face to the shock receiving member 104 respectively. A plurality of serrated bolts 110 (two bolts are shown in FIG. 1) are forced into the second connecting member 108 and extend through a flange 99b of the connecting member 98 and the car body 16. Nuts 112 are screwed onto the bolts 110 to fix the third portion 96 to the car body 16. As a result, the second fluid chamber 92 is defined between the second and third portions 95, 96.

A stopper carrier 114 is welded to the shock receiving member 104 and a bound stopper 116 is in turn welded to the stopper carrier 114.

In the embodiment shown in FIG. 1, the third portion 96 of the bushing is a spring carrier for a coil spring 118 which is disposed around the shock absorber 12. The coil spring 118 engages on a lower end a spring carrier 120 welded to the tube 20 of the shock absorber and on an upper end the third portion 96 to absorb vibration applied from wheels (not shown) together with the shock absorber 12.

A valve body 122 has a third path 124 capable of affording communication between the first and second paths 65, 66 of the valve base 60. In the embodiment shown in the drawing, the valve body 122 consists of slide portion rotatably disposed in the hole 64 in the valve base 60 and a reduced diameter portion extending upward integrally from the slide portion. The slide portion is provided with a third path 124 consisting of a path portion 125a extending axially from a lower end face to an intermediate portion and a path portion 125b opened diametrally from the path portion 125a to an outer peripheral surface. An upper end of the reduced diameter portion is formed as a flat portion 123.

In place of the embodiment shown in the drawings, the third path 124 in the valve body 122 may be formed of the path portion 125a and two path portions extending from the path portion 125a to an outer peripheral surface, spaced circumferentially 60° from each other and having different bores. In this case, a hole extending from the hole 64 to an outer peripheral surface may be provided in place of the holes 65b, 65c in the valve base 60.

A cylindrical holder 126 is forced into the hole 64 in the first member 68 of the valve base to be spaced from the hole bottom and the space below the holder 126 provides a reservoir chamber of fluid. The valve body 122 is disposed on an upper side of the holder 126 and further a thrust bushing 128 having low coefficient of friction is disposed on an upper side of the valve body 122. A holder 130 having O-rings fixed is inserted in an upper side of the thrust busing 128 to be held by a portion of washer 76 extending above the holder 130. According to such constitution, since the holder 130 is held by the nut 80 and the washer 76 coupling the piston rod 24 with the valve base 60, the holder 130 does not have to be forced into the hole 64. Thus, the holder 130 can be easily removed and interchanged when the O-rings and the valve body wear.

Figure 3:
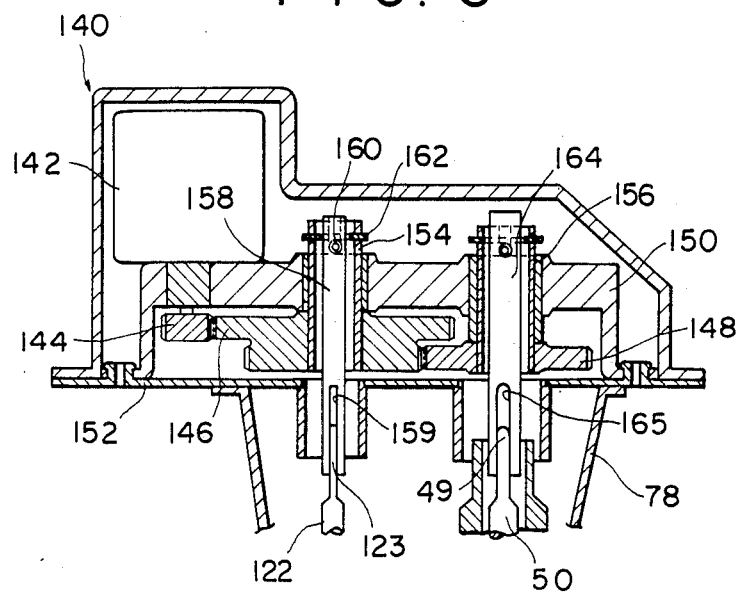
FIG. 3 is a sectional view showing an actuator of the suspension.

As shown in FIG. 3, an actuator 140 is provided with a motor 142, a gear 144, a stepped gear 146 and a gear 148. The motor 142 is fixed to a base 150 which is caulked to be securely fixed attached to an auxiliary base 152. A bracket 78 is welded to the auxiliary base 152.

Cylindrical members 154, 156 are rotatably supported by the base 150. The stepped gears 146 and the gear 148 fixed to the cylindrical members 154 and 156 respectively. One of the stepped gears meshes with the gear 144 fixed to an output shaft of the motor 142 and the other meshes with the gear 148.

The cylindrical member 154 is provided on the diameter of an end projecting from the base 150 with a pair of notches. On the other hand, a pin 160 forced into a rod 158 is disposed in the notches. A ring 162 is attached to the cylindrical member 154 for preventing the rod 158 from upwardly slipping-off. The pin 160 in the rod 158 contacts an end face of the base 150 to prevent the rod 158 from downward movement. The flat portion 123 of the valve body 122 is inserted into a slit 159 provided in a lower end of the rod 158.

A rod 164 having the same constitution as the rod 158 is supported by the cylindrical member 156. The upper flat portion 49 of the control shaft 50 is inserted into a slit 165 provided in a lower end of the rod 164.

The flat portion 49 of the control shaft 50 and the flat portion 123 of the valve body 122 are respectively used for locating paths provided therein by forming paths and respective flat portions such that the following relationship among paths is settled and the direction, for example, perpendicular to a flat surface of each flat portion is indentical with that of the extension of one of path portions or holes in each path. That is, when the path portion 53a of the path 52 in the control shaft 50 communicates to the path 46, the path portion 125b in the valve body 122 communicates to the hole 65b in the first path portion 65a. When the path portion 53b in the control shaft 50 communicates with the path 46, the path portion 125b in the valve body 122 communicates to the hole 65c in the first path portion 65a. When the control shaft 50 interrupts the path 46, the valve body 122 interrupts the first path portion 65a.

In the embodiment shown in the drawings, the actuator 140 is used for the control shaft 50 and the valve body 122 in common. That is, the damping force of the shock absorber and the spring constant of the bushing are constituted so as to be controlled by the same actuator 140 so that the cost and weight of the actuator can be reduced. However the actuators may be individually provided.

Fluid, i.e. oil and other liquid or air and other gas or mixture of liquid and gas are enclosed in the first and second fluid chambers 90, 92.

When an automobile travels, the actuator 140 is operated by the manual operation of a driver or the calculative operation of a controller for receiving signals from a speed sensor, acceleration sensor, steering wheel rotational angular speed sensor and other sensors, while the path 52 in the adjusting section is rotated through the control shaft 50 and at the same time the valve body 122 is rotated.

Figure 4:
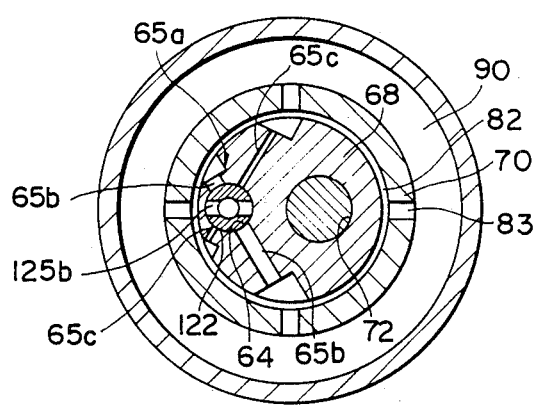
FIG. 4 is a sectional view taken along the line 4—4 in FIG. 1.
Figure 5:
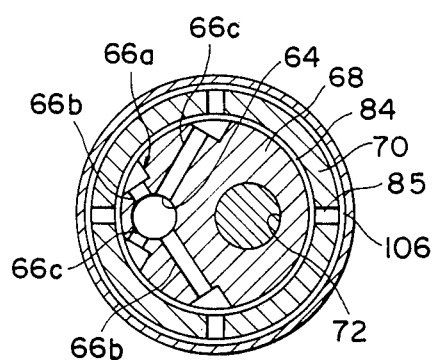
FIG. 5 is a sectional view taken along the line 5—5 in FIG. 1.

When the valve body 122 is in the position shown in FIG. 4, the path 46 in the piston rod 26 is interrupted by the control shaft 50. Consequently, the damping force of the shock absorber 12 and the spring constant of the bushing 62 are both kept under the hard condition.

When the valve body 122 is rotated 60° clockwise, the path portion 125b in the valve body 122 is opposed to a pair of holes 65b in the first path 65 of the valve base. Then, the path 46 in the piston rod 24 is opposed to the large-bored path portion 53a of the path 52. As a result, the liquid chambers A, B in the shock absorber 12 communicate with each other through the large-bored path portion 53a of the path 52 in addition to the ports 28, 30 provided in the piston 22, so that the damping force produced in the shock absorber 12 is reduced. On the other hand, since the first liquid chamber 90 communicates with the second liquid chamber 92 through the large-bored hole 65b, the spring constant of the bushing 62 is softened, and a small damping force is produced by the liquid flow. As a result, the shock absorber 12 and the bushing 62 present the soft properties.

When the valve body 122 is further rotated 60° clockwise, the path portion 125b in the valve body 122 is opposed to a pair of holes 65c of the first path 65 in the valve base, and the path 46 in the piston rod 24 is opposed to the small-bored path portion 53b of the path 52. As a result, the liquid chambers A, B in the shock absorber 12 communicate to each other through the small-bored path portion 53b of the path 52 in addition to the ports 28, 30 provided in the piston 22, so that the damping force produced in the shock absorber is a medium one. On the other hand, since the first and second fluid chambers 90, 92 communicate with each other through the small-bored hole 65c, the spring constant of the bushing 62 is a medium one and the damping force is increased.

Obviously, numerous modifications and variations of the present invention are possible in light of the above teachings. It is therefore to be understood that within the scope of the appended claims, the invention may be practiced otherwise than as specifically described herein.

What is claimed is:

1. A suspension system for a vehicle, comprising:
    a shock absorber provided with a tube, a piston partitioning the interior of the tube into two liquid chambers and a piston rod connected to said piston and having a bypass path for affording communication between said two liquid chambers;
    a control shaft disposed in said piston rod of the shock absorber to open and close said bypass path;
    a support for coupling said piston rod to a car body and provided with a rigid valve base connected to said piston rod and having a hole in which a valve body is disposed and an elastic bushing disposed radially outward of and secured fixedly to said valve base, the bushing being connected to the car body and having a plurality of fluid chambers;
    the valve body being disposed in said hole of the valve base to afford and interrupt communication between said fluid chambers; and
    at least one actuator for operating said control shaft and valve body.

2. A suspension as claimed in claim 1, wherein the damping force of said shock absorber and spring constant and damping force of said bushing can be changed over in a plurality of steps.

3. A suspension as claimed in claim 2, wherein the damping force of said shock absorber is changed over in three steps and the spring constant and damping force of said bushing can be changed over in three steps.

4. A suspension as claimed in claim 3, wherein said control shaft has a path consisting of two path portions having different bores and said valve base has a path consisting of two path portions having different bores.

5. A suspension system as claimed in claim 3, wherein said valve body has a path consisting of two path portions having different bores.

6. A suspension as claimed in claim 2, wherein said control shaft and said valve body have respectively flat portions which locate paths provided respectively in said control shaft and valve body.

7. A suspension system as claimed in claim 1, wherein said at least one actuator comprises a single actuator and wherein said control shaft and valve body are operated by said single actuator.

8. A suspension system as claimed in claim 1, wherein said at least one actuator comprises first and second individual actuators and wherein said control shaft and valve body are operated respectively by said first and second individual actuators.

9. A suspension system for a vehicle, comprising:
    a shock absorber provided with a tube, a piston partitioning the interior of the tube into two liquid chambers and a piston rod connected to said piston and having a bypass path for affording communication between said two liquid chambers;
    a control shaft disposed in said piston rod of the shock absorber to open and close said bypass path;
    a support for coupling said piston rod to a car body and provided with a rigid valve base connected to said piston rod and having a hole in which a valve body is disposed and an elastic bushing disposed radially outward of and secured fixedly to said valve base, the bushing being connected to the car body and having two fluid chambers;
    the valve body being disposed in said hole of the valve base to afford and interrupt communication between said two fluid chambers;
    an actuator for operating said control shaft and valve body;
    said control shaft having a path consisting of two path portions having different bores wherein the damping force of said shock absorber is changed over in three steps; and
    said valve base having a path consisting of two path portions having different bores and the spring constant and damping force of said bushing being changed over in three steps.

* * * * *